(12) United States Patent
Parsons

(10) Patent No.: US 11,541,995 B2
(45) Date of Patent: Jan. 3, 2023

(54) ROTOR BLADE ASSEMBLY FOR BEARINGLESS ROTOR

(71) Applicant: LOCKHEED MARTIN CORPORATION, Bethesda, MD (US)

(72) Inventor: Eric S. Parsons, Middlebury, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 106 days.

(21) Appl. No.: 16/928,605

(22) Filed: Jul. 14, 2020

(65) Prior Publication Data

US 2022/0017213 A1 Jan. 20, 2022

(51) Int. Cl.
*B64C 27/48* (2006.01)
*B64C 27/33* (2006.01)
*B64C 27/82* (2006.01)

(52) U.S. Cl.
CPC .............. *B64C 27/48* (2013.01); *B64C 27/33* (2013.01); *B64C 27/82* (2013.01)

(58) Field of Classification Search
CPC ......... B64C 27/48; B64C 27/82; B64C 27/33; B64C 2027/4736
See application file for complete search history.

(56) References Cited

U.S. PATENT DOCUMENTS

| 3,476,484 | A | | 11/1969 | Brunsch |
| 3,950,115 | A | | 4/1976 | Euler |
| 4,038,885 | A | * | 8/1977 | Jonda ...................... B29C 70/20 |
| | | | | 74/581 |
| 5,181,829 | A | | 1/1993 | Pancotti |
| 5,286,167 | A | | 2/1994 | Byrnes et al. |
| 5,632,602 | A | | 5/1997 | Herrmann et al. |
| 9,045,986 | B2 | | 6/2015 | Bianchi et al. |
| 9,085,986 | B2 | * | 7/2015 | Bianchi ................... B64C 11/26 |
| 9,150,305 | B2 | * | 10/2015 | Mancher ................. B64C 27/33 |
| 9,366,155 | B2 | | 6/2016 | Tutja et al. |
| 10,549,841 | B2 | | 2/2020 | Nussenblatt et al. |

\* cited by examiner

*Primary Examiner* — Juan G Flores
(74) *Attorney, Agent, or Firm* — Foley & Lardner LLP

(57) ABSTRACT

A structural member for use in a rotor system which rotates about a rotational axis includes a pin which extends substantially perpendicular to the rotational axis, a filler component positioned adjacent the pin, and a plurality of layers of composite material having fibers oriented lengthwise along a central axis which is perpendicular to the rotational axis. The plurality of fibers in the layers of composite material is wrapped about the pin and the filler component such that the fibers extend along the central axis and the plurality of layers form an opening filled by the filler component and which decreases as a function of distance from the pin along the central axis.

19 Claims, 3 Drawing Sheets

ROTOR BLADE ASSEMBLY FOR BEARINGLESS ROTOR

STATEMENT OF FEDERAL SUPPORT

This invention was made with government support under H92236-17-C-0002. The government has certain rights in the invention.

BACKGROUND

The present disclosure relates to a bearingless rotor system, and more particularly, to a system for mounting a flexbeam of a rotor blade assembly to a rotor hub.

Bearingless rotor systems utilize a flexible structural member, commonly termed a "flexbeam" or "flexbeam connector" for retention of a helicopter rotor blade to a torque drive hub member. Basic operational constraints of rotary wing flight impose substantial functional complexity upon the rotor flexbeam necessitated by the need to accurately control the multi-directional displacement of the rotor blades, i.e., flapwise and edgewise bending, and torsional or pitch change motions. The flexbeam, which is typically comprised of fiber reinforced resin matrix materials, reduces the weight, complexity, and maintenance of the rotor assembly while, furthermore, improving the reliability and damage tolerance thereof.

In existing rotor systems, the flexbeam is typically attached to the rotor hub via a bolted connection. Accordingly, a series of holes are drilled at the inboard end of the flexbeam, and these holes receive fasteners that mechanically couple the flexbeam to the rotor hub. Because drilling holes in the flexbeam weakens the strength and rigidity of the flexbeam, the thickness of the flexbeam at the region of the bolted attachment is substantially thicker than what would otherwise be required to react the loads acting on the rotor blade. This adds considerable weight and complexity to the rotor blade.

BRIEF DESCRIPTION

According to an embodiment, a structural member for use in a rotor system which rotates about a rotational axis includes a pin which extends substantially perpendicular to the rotational axis, a filler component positioned adjacent the pin, and a plurality of layers of composite material having fibers oriented lengthwise along a central axis which is perpendicular to the rotational axis. The plurality of fibers in the layers of composite material is wrapped about the pin and the filler component such that the fibers extend along the central axis and the plurality of layers form an opening filled by the filler component and which decreases as a function of distance from the pin along the central axis.

In addition to one or more of the features described above, or as an alternative, in further embodiments the pin is cylindrical in shape and has a generally hollow interior to receive a bolt when connected to the rotor system.

In addition to one or more of the features described above, or as an alternative, in further embodiments the filler component is arranged directly adjacent and in contact with the pin.

In addition to one or more of the features described above, or as an alternative, in further embodiments the filler component is generally triangular in shape and an end of the filler component adjacent to the pin is equal in length to a diameter of the pin.

In addition to one or more of the features described above, or as an alternative, in further embodiments at least one of a size and shape of the filler component is selected to tune a natural frequency of the structural member.

In addition to one or more of the features described above, or as an alternative, in further embodiments a first end and a second opposite end of each of the plurality of layers of composite material is positioned at an outboard end of the structural member.

According to another embodiment, a rotor system of a rotary wing aircraft includes a rotor hub rotatable about an axis of rotation, a rotor blade having an aerodynamic shape and connected to the rotor hub to rotate about the axis of rotation, and a structural member connected to and extending radially outward from the rotor hub and connected to the rotor blade. The structural member includes a plurality of layers of composite material having fibers oriented lengthwise along a central axis which is perpendicular to the rotational axis and which are wrapped about a pin arranged adjacent an inboard end of the structural member adjacent the rotor hub such that the fibers extend along the central axis to carry a centrifugal load of the rotor blade and the plurality of layers form an opening filled by the filler component and which decreases as a function of distance from the pin along the central axis. A fastener is receivable within the pin to couple the structural member to the rotor hub.

In addition to one or more of the features described above, or as an alternative, in further embodiments the structural member comprises a flex beam.

In addition to one or more of the features described above, or as an alternative, in further embodiments the structural member further comprises a filler component arranged within an interior of the structural member, the filler component being positioned adjacent the mounting component.

In addition to one or more of the features described above, or as an alternative, in further embodiments the filler component is arranged directly adjacent and in contact with the mounting component.

In addition to one or more of the features described above, or as an alternative, in further embodiments the filler component is generally triangular in shape and an end of the filler component adjacent to the mounting component is equal in length to a diameter of the mounting component.

In addition to one or more of the features described above, or as an alternative, in further embodiments at least one of a size and shape of the filler component is selected to tune a natural frequency of the structural member.

In addition to one or more of the features described above, or as an alternative, in further embodiments the rotor hub includes an upper hub plate and a lower hub plate axially stacked along the axis of rotation, the upper hub plate being fastened to the lower hub plate.

In addition to one or more of the features described above, or as an alternative, in further embodiments the upper hub plate includes a first plurality of arms and the lower hub plate includes a second plurality of arms, each of the first plurality of arms being aligned with a respective one of the second plurality of arms to define a clearance there between, the inboard end of the structural member being positioned within the clearance.

In addition to one or more of the features described above, or as an alternative, in further embodiments a height of the clearance measured parallel to the axis of rotation varies over a radial length.

In addition to one or more of the features described above, or as an alternative, in further embodiments the inboard end of the structural member has a tapered configuration and a configuration of the clearance is generally complementary to the tapered configuration.

In addition to one or more of the features described above, or as an alternative, in further embodiments a first end and a second opposite end of each of the plurality of layers of composite material is positioned at an outboard end of the structural member.

In addition to one or more of the features described above, or as an alternative, in further embodiments the structural member is symmetrical about a horizontal plane containing a central axis of the structural member.

In addition to one or more of the features described above, or as an alternative, in further embodiments the rotor system is a tail rotor system of an aircraft.

In addition to one or more of the features described above, or as an alternative, in further embodiments the rotor system is a main rotor system of an aircraft.

DETAILED DESCRIPTION

A detailed description of one or more embodiments of the disclosed apparatus and method are presented herein by way of exemplification and not limitation with reference to the Figures.

Figure 1:
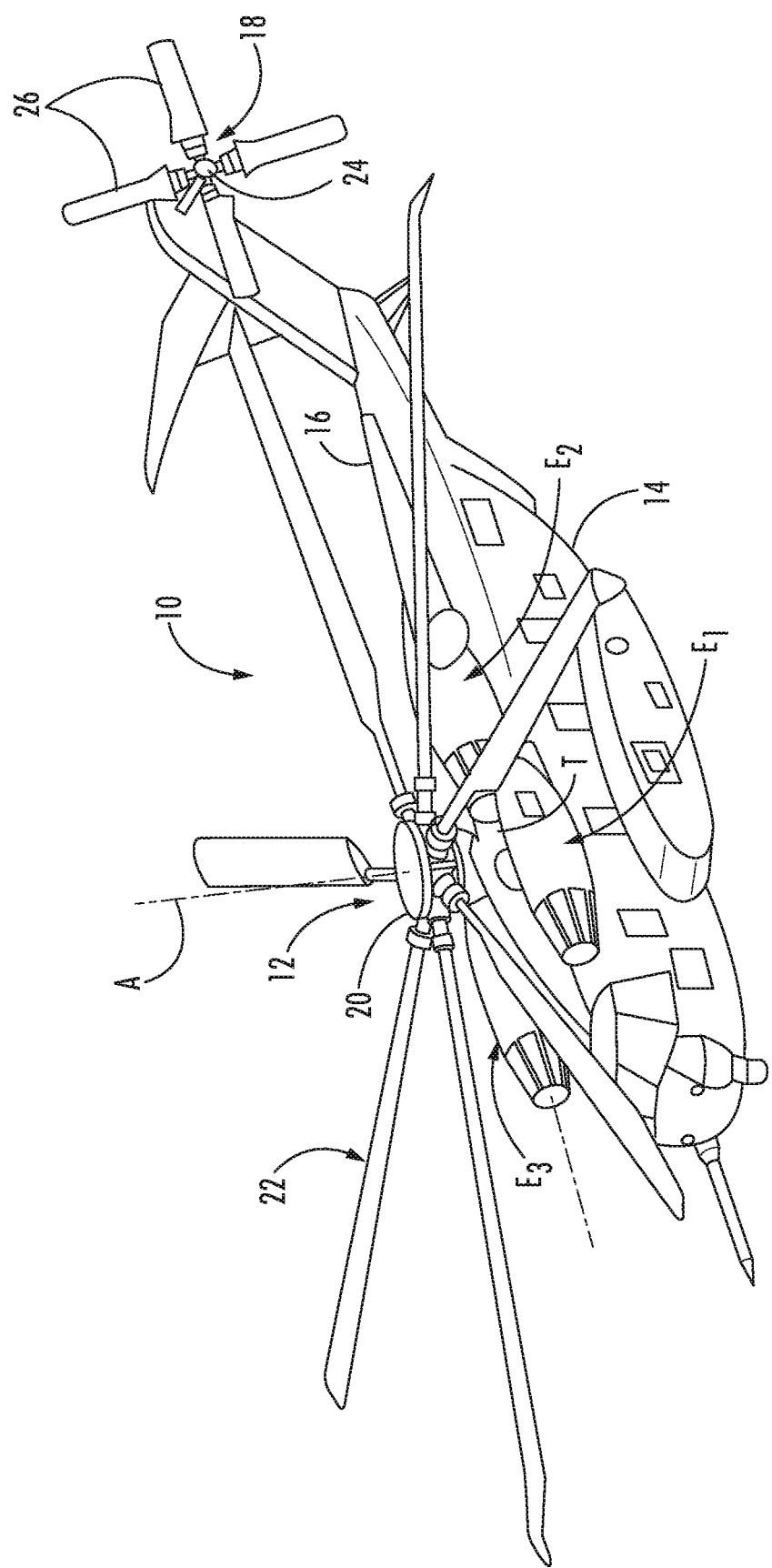
FIG. 1 is a schematic diagram of an example of a vertical takeoff and landing (VTOL) rotary wing aircraft.

Referring now to FIG. 1, an example of a rotary-wing aircraft 10 including a main rotor system 12 is illustrated. As shown, the aircraft 10 includes an airframe 14 having an extending tail 16 which mounts a tail rotor system 18 as an anti-torque system. The main rotor system 12 is driven about an axis of rotation A through a main gearbox (illustrated schematically at T) by one or more engines E. The main rotor system 12 includes a rotor hub 20 having a plurality of rotor blade assemblies 22 mounted to and projecting radially outwardly therefrom. The tail rotor system 18 similarly includes a rotor hub 24 having a plurality of tail rotor blade assemblies 26 projecting radially outwardly therefrom. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present disclosure.

Figure 2:
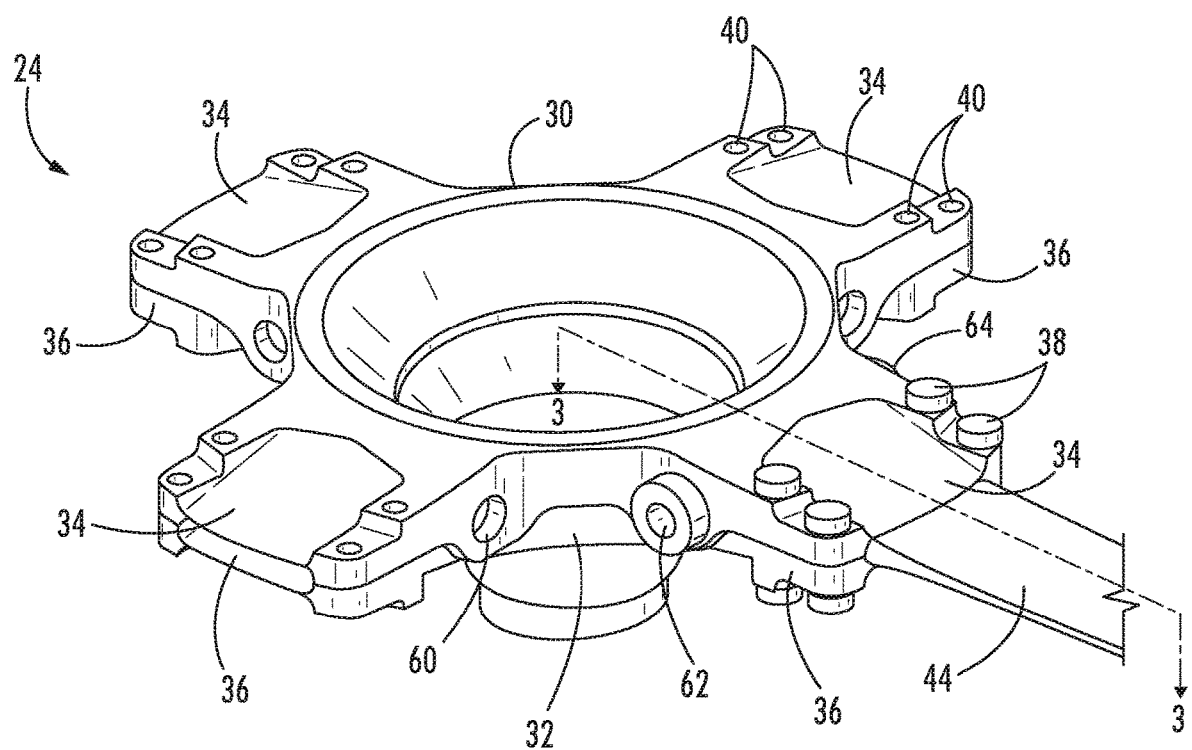
FIG. 2 is a perspective view of a rotor hub having a structural member connected thereto according to an embodiment.
Figure 3:
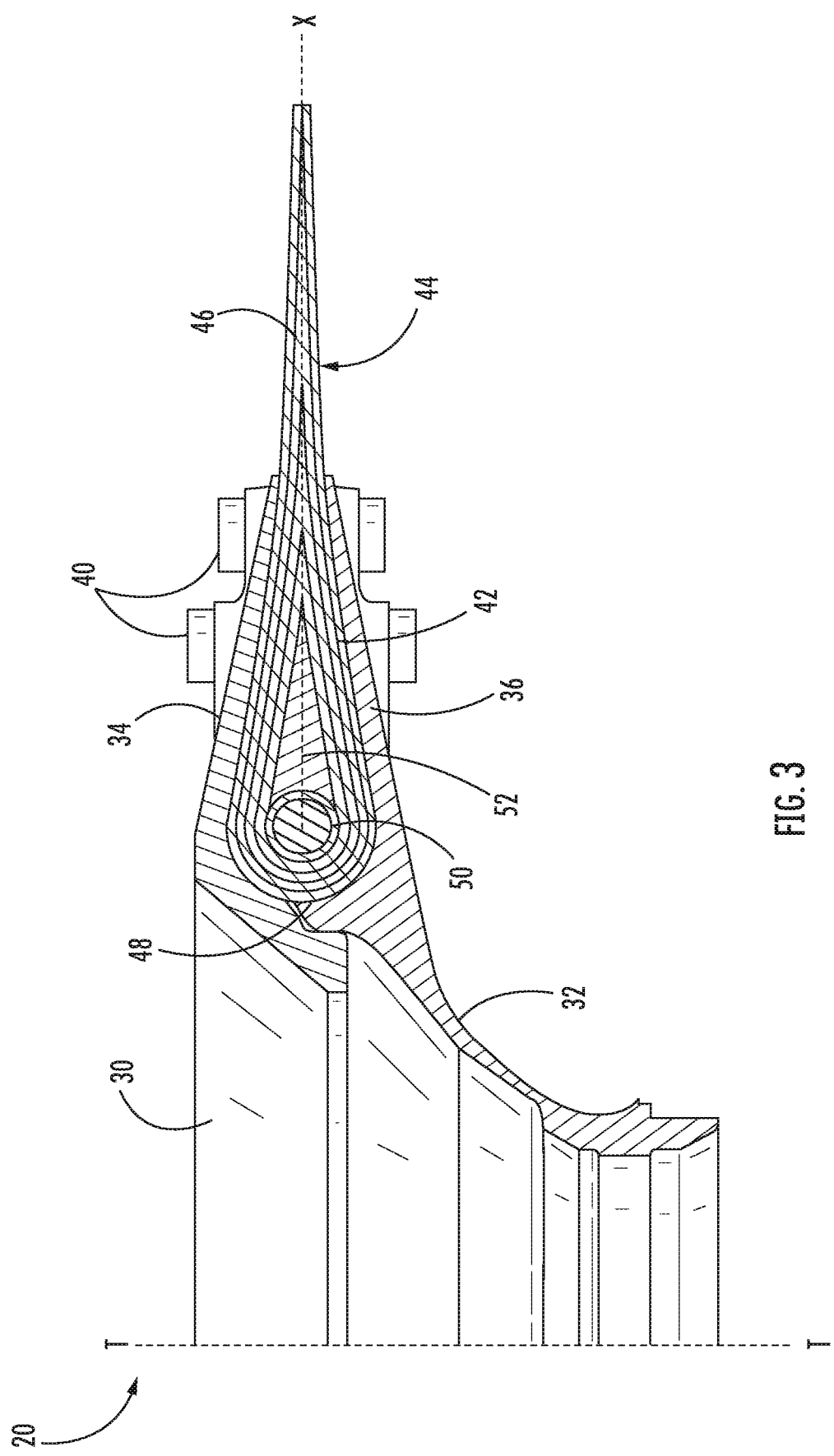
FIG. 3 is a cross-sectional view of the rotor hub of FIG. 3 taken along line 3-3 according to an embodiment.

Referring now to FIGS. 2 and 3, the interface between the rotor hub 24 of the tail rotor system 18 and a portion of a tail rotor blade assembly 26 is illustrated in more detail. In the illustrated, non-limiting embodiment, the rotor hub 24 has a multipart construction. For example, the rotor hub 24 includes a first hub portion 30, such as an upper hub plate for example, and a second hub portion 32, such as a lower hub plate for example. However, embodiments where the rotor hub 24 has a different construction, for example the rotor hub 24 includes more than two components for example, are also contemplated herein.

In an embodiment, as shown, each of the upper hub plate 30 and the lower hub plate 32 includes a plurality of radially outwardly extending arms 34, 36 respectively. The upper and lower hub plates 30, 32 are vertically spaced relative to one another along the tail rotor axis T and the arms 34 of the upper hub plate 30 are generally aligned with the arms 36 of the lower hub plate 32 to define pairs of rotor arms. In an embodiment, one or more fasteners 38, such as a bolt, extend through at least one first opening 40 formed in the arm 34 of the upper hub plate 30 and at least one axially aligned second opening (not shown) formed in the arm 36 of the lower hub plate 32 to secure the upper and lower hub plates 30, 32 together.

As a result of the configuration of the arms 34, 36 of the upper hub plate 30 and the lower hub plate 32, a clearance 42 (see FIG. 3) is defined between each pair of aligned arms 34, 36. In an embodiment, each arm 34 of the upper hub plate 30 is configured with a downward slope and each arm 36 of the lower hub plate 32 is configured with an upward slope such that the height of the clearance 42, measured parallel to the rotor axis T, decreases over the radial length of the arms 34, 36 and the clearance 42 decreases with increasing radial distance along a central axis X. However, embodiments where the clearance 42 has another configuration, such as a uniform height over the radial length of the arms 34, 36, is also within the scope of the disclosure.

A portion of a structural member 44 of a tail rotor blade assembly 26, such as a flexbeam for example, is positionable within the clearance 42 defined between an arm 34 of the upper hub plate 30 and an adjacent arm 36 of the lower hub plate 32. A cross-sectional view of the structural member 44 is illustrated in more detail in FIG. 3. As shown, the structural member 44 is formed from a composite material 46, for example including a plurality of stacked layers or plies of fibers. The inboard end 48 of the structural member 44 has a thickness, measured parallel to the rotor axis T, substantially greater than a remainder of the structural member 44. In the illustrated, non-limiting embodiment, the inboard end 48 of the structural member 44 includes a generally hollow pin or fastener 50. In an embodiment, the pin 50 may be preloaded. The diameter of the pin 50, and the resultant radius of curvature at the inboard end 48 of the structural member 44, may be selected in response to a loading of the tail rotor blade assembly 26 and to maximize joint efficiency.

Further, a filler component 52 may be positioned outboard of the preloaded pin 50, such as directly adjacent and in contact with the preloaded pin 50 for example. In the illustrated, non-limiting embodiment, the filler component 52 is generally triangular in shape and the side of the filler component 52 arranged in contact with the pin 50 is generally complementary in size and shape to the pin 50. Inclusion of the filler component 52 results in a gradual taper extending from the pin 50 at the inboard end 48 of the structural member 44 toward a more outboard portion of the structural member 44. This taper can be used to not only reduce the stresses of the structural member 44 where the structural member 44 is a flexbeam, but also, in some embodiments, to tune the natural frequency of the structural member 44.

To form the structural member 44, a central portion of each layer of the composite material 46 is wrapped about the preloaded pin 50 and the filler component 52, such that a first end (not shown) and a second end (not shown) of the layer of composite material 46 are arranged adjacent the outboard end of the structural member 44. As a result, each layer or ply of composite material 46 defines both a first layer arranged upwardly adjacent the central axis X of the structural member and a second layer arranged downwardly adjacent the central axis X of the structural member 44. Accordingly, the structural member 44 may be substantially symmetrical about a horizontal plane containing the central axis X. Within each layer, the fibers may be oriented unidirectionally, such as radially relative to the tail rotor axis T such that the fibers remain unidirectional along the central axis X while wrapping around the pin 50 and component 52.

The inboard end 48 of a structural member 44 is receivable within the clearance 42 defined between each pair of arms 34, 36. For example, as shown in FIG. 3, both the preloaded pin 50 and the filler component 52, in their entirety, may be disposed within the clearance 42. However, embodiments where only a portion of the filler component 52 is arranged within the clearance 42 is also within the scope of the disclosure. As shown, the configuration of the clearance 42 may be generally complementary to the taper of the inboard end 48 of the structural member 44 to limit movement of the structural member 44 relative to the rotor hub 24.

In an embodiment, an opening 60 extending generally parallel to the preloaded pin 50, and generally perpendicular to the rotor axis T is defined between each pair of arms 34, 36. When the structural member 44 is arranged within the clearance 42, the preloaded pin 50 and the opening 60 are coaxial. A fastener 62, such as a bolt for example, may be mounted within both the opening 60 and the hollow center of the preloaded pin 50, and at least one nut 64 may be used to couple the fastener 62, and therefore the structural member 44, to the rotor hub 24. Accordingly, the preloaded pin 50 arranged within the inboard end 48 of the structural member 44 functions as a mounting component for mounting the structural member to the rotor hub 24. The preloaded pin 50 and fastener 62 cooperate to transfer centrifugal loads acting on the rotor blade to the rotor hub 24. Additionally, the structure of the rotor hub 24 surrounding the joint with the inboard end of the flexbeam 44 is configured to react flatwise, edgewise and torsion loads. Although the interface is illustrated and described herein with reference to a tail rotor hub 24 and a tail rotor blade assembly 26, it should be understood that the interface could alternatively or additionally be defined between the rotor hub 20 and a rotor blade assembly 22 of the main rotor system 12 of the aircraft.

The structural member 44 described herein may be connected to a rotor hub 24 without piercing the composite material and therefore compromising the integrity of the structural member 44. Further, both the flexbeam 44 and tail rotor hub 24 illustrated and described herein may be easier and faster to manufacture than their existing counterpart components. Additionally, the excess material at the inboard end 48 of the flexbeam 44 is minimized, thereby reducing the material, cost, and weight of the system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor system comprising:
   a rotor hub rotatable about a rotational axis;
   a structural member which rotates about the rotational axis, wherein the structural member is connected to and extends from the rotor hub, the structural member comprising:
   a pin which extends substantially perpendicular to the rotational axis, the pin being cylindrical in shape and having a hollow interior structured to receive a bolt when the pin is connected to the rotor system;
   a filler component positioned adjacent the pin; wherein the filler component is triangular in shape, and wherein an end of the filler component is directly adjacent to the pin; and
   a plurality of layers of composite material having fibers oriented lengthwise along a central axis which is perpendicular to the rotational axis, wherein the fibers in the plurality of layers of composite material are wrapped about the pin and the filler component such that the fibers extend along the central axis and the plurality of layers form an opening filled by the filler component and which decreases as a function of distance from the pin along the central axis;
   wherein an inboard end of the structural member is configured to be received within a clearance defined between a pair of arms extending from and integrally formed with the rotor hub.

2. The rotor system of claim 1, wherein the filler component is in contact with the pin.

3. The rotor system of claim 1, wherein the end of the filler component adjacent to the pin is equal in length to a diameter of the pin.

4. The rotor system of claim 1, wherein at least one of a size and shape of the filler component is selected to tune a natural frequency of the structural member.

5. The rotor system of claim 1, wherein a first end and a second opposite end of each of the plurality of layers of composite material is positioned at an outboard end of the structural member.

6. The rotor system of claim 1, wherein a portion of the filler component is arranged within the clearance.

7. The rotor system of claim 1, wherein the structural member has a tapered shape and the clearance has a complementary shape to the tapered shape of the structural member.

8. A rotor system of a rotary wing aircraft comprising:
   a rotor hub rotatable about an axis of rotation;
   a rotor blade having an aerodynamic shape and connected to the rotor hub to rotate about the axis of rotation;
   a structural member connected to and extending radially outward from the rotor hub and connected to the rotor blade, wherein the structural member includes a plurality of layers of composite material having fibers oriented lengthwise along a central axis which is perpendicular to the rotational axis and which are wrapped about a pin arranged adjacent an inboard end of the structural member adjacent the rotor hub such that the fibers extend along the central axis to carry a centrifugal load of the rotor blade and the plurality of layers form an opening filled by a filler component and which decreases as a function of distance from the pin along the central axis;

a fastener receivable within the pin to couple the structural member to the rotor hub;

wherein the rotor hub includes an upper hub plate and a lower hub plate axially stacked along the axis of rotation, the upper hub plate being fastened to the lower hub plate.

9. The rotor system of claim 8, wherein the structural member comprises a flex beam.

10. The rotor system of claim 8, wherein the filler component is arranged directly adjacent and in contact with the pin.

11. The rotor system of claim 8, wherein the filler component is generally triangular in shape and an end of the filler component adjacent to the pin is equal in length to a diameter of the pin.

12. The rotor system of claim 8, wherein at least one of a size and shape of the filler component is selected to tune a natural frequency of the structural member.

13. The rotor system of claim 8, wherein the upper hub plate includes a first plurality of arms and the lower hub plate includes a second plurality of arms, each of the first plurality of arms being aligned with a respective one of the second plurality of arms to define a clearance there between, the inboard end of the structural member being positioned within the clearance.

14. The rotor system of claim 13, wherein a height of the clearance measured parallel to the axis of rotation varies over a radial length.

15. The rotor system of claim 14, wherein the inboard end of the structural member has a tapered configuration and a configuration of the clearance is generally complementary to the tapered configuration.

16. The rotor system of claim 8, wherein a first end and a second opposite end of each of the plurality of layers of composite material is positioned at an outboard end of the structural member.

17. The rotor system of claim 8, wherein the structural member is symmetrical about a horizontal plane containing a second central axis of the structural member.

18. The rotor system of claim 8, wherein the rotor system is a tail rotor system of an aircraft.

19. The rotor system of claim 8, wherein the rotor system is a main rotor system of an aircraft.

* * * * *